US006895594B1

(12) United States Patent
Simoes et al.

(10) Patent No.: US 6,895,594 B1
(45) Date of Patent: May 17, 2005

(54) SWITCH MATRIX PACKAGING FOR HIGH AVAILABILITY

(76) Inventors: Michael J. Simoes, 67 Four Winds Dr., Fall River, MA (US) 02720; John L. Moran, III, 82 Providence St., Millville, MA (US) 01529; Stanley Ivas, 19 Lantern La., Mansfield, MA (US) 02048

( * ) Notice: Subject to any disclaimer, the term of this patent is extended or adjusted under 35 U.S.C. 154(b) by 724 days.

(21) Appl. No.: 09/691,624

(22) Filed: Oct. 18, 2000

(51) Int. Cl.[7] .............................................. H04N 7/173
(52) U.S. Cl. ..................................... 725/127; 725/111
(58) Field of Search .............................. 725/127, 111, 725/109, 114, 116, 117; H04N 7/173

(56) References Cited

U.S. PATENT DOCUMENTS 5,063,587 A * 11/1991 Semasa et al. ........... 348/14.14
6,018,767 A * 1/2000 Fijolek et al. ............... 709/218
6,038,303 A * 3/2000 Sanford et al. ......... 379/201.01

* cited by examiner

Primary Examiner—Vivek Srivastava

(57) ABSTRACT

A cable interface system for a high availability, high frequency cable network. An example embodiment includes a Radio Frequency Matrix Switch which connects N cable head ends with N+1 Cable Modem Termination Systems by a set of coaxial cables having 75 ohm BNC connectors in the forward path and 75 ohm connectors in the return path. Push-on type connectors along with reduced size connectors and cables provide increased access to connection points on interface panels. Angled interface panels on the Radio Frequency Matrix Switch provide increased connector space. Grouping of connection points on a the Radio Frequency Matrix Switch simplifies installation and replacement of cables. The Radio Frequency Matrix Switch can immediately switch a spare Cable Modem Termination System into service as necessary to avoid down time.

16 Claims, 7 Drawing Sheets

SWITCH MATRIX PACKAGING FOR HIGH AVAILABILITY

FIELD OF THE INVENTION

The present invention relates generally to cable network interface connections and more specifically to a system for providing high availability for a cable network.

BACKGROUND OF THE INVENTION

Radio Frequency Matrix Switches (RF Matrix Switches) are going to be required in order to provide High Availability (HA) internet protocol (IP) telephony over a cable television network. The RF Matrix Switches are physically and logically placed between a set of DOCSIS (Data Over Cable Service Interface Specification) Cable Modem Termination Systems (CMTS) and cable TV head-end network equipment. The cable TV network head-end equipment is typically an RF network of combiners and splitters that eventually exit the cable TV network head-end as an optical signal via a laser in the forward path; or enter into the head-end as an optical signal via Optical receiver from the return path. In the United States as an example, the forward path signals range from 54 MHz to 860 MHz while the return path signals range from 5 MHz to 42 MHz.

Cable television networks were originally designed to provide one-way, downstream transmission of electrical signals via Coaxial Distribution Plant (see FIG. 1 and FIG. 2) for distribution of Analog television signals. Modern Cable TV Networks are TWO-WAY (bi-directional signals) systems that are a combination of Coaxial Distribution plants and Fiber transmission and is commonly referred to as Hybrid Fiber Coax (HFC) Plant design (see FIG. 3). The intent of the HFC Cable TV Network design was to give CATV Networks Systems up to twice the bandwidth and significantly better Carrier to Noise Ratio (C/N), thus affording the Cable Operators to the ability to support the transmission of broadband data, telephony and digital video signals as well as the traditional Analog Video Signals. As is the case in both the older Cable TV Networks and the HFC Cable TV Networks, the Coaxial RF Distribution Plant portion of the CATV Network connects individual users (regardless of the type of application such as IP Telephony, Switched Telephony, data, digital video and analog video signals), to cable head-ends of various cable operator service providers. Standard size cables terminated by standard F-type connectors are commonly used throughout cable television networks. In CATV Headends, the standard connectors, typically threaded F type connectors, provide electrical and mechanical connections between coaxial cables and network components at numerous connection points within the Headend Facility.

Because the Cable TV Headend for HFC Networks has a high concentration of Return Path Nodes (See FIG. 3), there are multiple connection points required at various junctions in the Headend cable network. Often, dozens or hundreds of cables must be connected to a network component wherein space for connection points is limited. Connection points are therefore often crowded. The crowded interfaces leave minimal space for manual access or tool access to the threaded connection points. The access space constraints often cause installation and replacement of cables to be difficult and time consuming.

As stated above, the advent of bi-directional communication over cable networks for cable internet connections and cable telephony, significantly increases the number of cable connection points that are required at various network components because additional return path cables were added to cable networks. Furthermore, cable internet applications and cable telephony applications that require enhanced fault tolerance, i.e. high availability, require additional cable connections to accommodate more spare components. The additional number of connection points necessarily increases the size of network components to which cables are connected or increases crowding at the at the cable interface of the network components. Increased crowding at connection points reduces access to connection points for cable installation and replacement.

Visual access to cable connection points is also diminished at an overcrowded cable network interface. A technician's impeded view of a connection point may cause the technician to disconnect an incorrect cable or to connect a replacement cable to an incorrect connection point. Such errors are likely to decrease system availability.

High availability cable network systems involve a large number of connection points to an RF Matrix Switch. Conventional cables having F-type connectors are overly crowded at such matrix switch connection points thereby impeding visual and physical service access to the connection points. Standard F-Type connectors are mechanically secured to connection points by threaded collars, which require substantial access space for cable removal and installation. Installation or replacement of CMTS units in a High Availability cable network having conventional connections at crowded interface panels is therefore disadvantageously time consuming and susceptible to incorrect connections.

Interface panels are available having large areas to provide space for increasing numbers of connection points. The larger interface panels are disadvantageously wide or tall. Cable service providers and other users of such interface panels disfavor using interface panels having wider or taller dimensions because such panels consume valuable cabinet space and often do not fit properly into existing cabinets or mounting structures. For example, standard 6U interface panels having a vertical height of 10.5 inches do not meet customer marketing requirements for systems having superior space utilization.

Cable interface panels are typically oriented vertically so that cables protrude horizontally from connection points on the panel. Cables that protrude horizontally from connection points on a vertical panel typically hang from terminating connectors thereby pulling downwardly on the joint between the cable and its terminating connector. The downward stresses often degrade an electrical connection at the joint between the cable and its terminating connector.

SUMMARY OF THE INVENTION

The present invention is directed towards a network interface apparatus. One embodiment includes a matrix switch comprising a cable network component including a first inclined cable interface panel and a second inclined cable interface panel that meet at an apex, and define a surface of the cable interface component Cable connection points on the first inclined interface panel are suitable for mating with cables that connect the cable network component to a cable head end component, wherein said cable connection points on the first inclined interface panel are grouped based on connections to the cable head end component. Also, cable connection points on the second inclined interface panel are suitable for mating with cables that connect the cable network component to a plurality of CMTS components wherein the cable connection points on the second inclined interface panel are grouped based on connections to individual CMTS components. Switching components in the matrix switch selectively provide electrical connections between the cable connection points on the first inclined interface panel and the cable connection points on the second inclined interface panel.

The second inclined interface panel includes one more group of cable connection points than the first inclined interface panel. The extra group of cable connection points on the second inclined interface panel connect to a spare CMTS component. A DOCSIS compliant CMTS design typically consists of one Forward Path Transmitter transmitting either a 64 Point QAM (Quadrature Amplitude Modulation) modulated carrier or 256 Point QAM modulated carrier and either four or eight Return Path Receivers receiving either QPSK (Quadra Phase-Shift Keying) or 16 Point QAM modulated carriers. A CMTS having one forward path circuit and four return path circuits is often referred to as a 1×4 slice or brick. Slices or bricks having one forward path circuit and eight return path circuits (1×8 slices or bricks) are also commonly used in cable TV networks. Other configurations are possible, for example, a slice or brick may have two transmitters thereby providing a 2×4 configuration or a 2×8 configuration. A CMTS may include any combination of transmitter circuits and receiver circuits. The DOCSIS specifications include the Data-Over-Cable Service Interface Specifications Radio Frequency Interface Specification SP-RFI-I02-971008 (DOCSIS 1.0), and Data-Over-Cable Service Interface Specifications Radio Frequency Interface Specification SP-FRIv1.1-I03-991105RF Specifications (DOCSIS 1.1), which are incorporated by reference.

An embodiment for an RF Matrix Switches uses an N+1 redundancy scheme to provide High Availability functionality for applications including IP telephony cable transmissions. The N+1 redundancy scheme is implemented by providing one spare DOCSIS CMTS for a set of up to five primary DOCSIS CMTS. The RF Matrix switch is connected to each primary CMTS and to the spare CMTS. Upon failure of any of the primary CMTS units, the RF Matrix switch disconnects the failed CMTS circuits from the head-end network and switches in the spare CMTS. A technician or engineer may then replace the failed CMTS. The replacement CMTS may then function as a spare or the original configuration may be reestablished.

An RF Matrix Switch according to one embodiment of the present invention with a vertical height of about 5.25 inches (3U standard height) provides accessible connection points for five primary CMTSs and one backup CMTS. One (or optionally two) forward path cable(s) and eight return path cables are connected from each of six CMTSs to the RF Matrix Switch, corresponding to a total of six (or optionally twelve) forward path cables and forty-eight return path cables. Cables having a smaller diameter are used for return path connections. Quick-connect/disconnect termination of the cables allows installation and replacement of cables with minimum access.

A multi-surface face plate includes an upper inclined top surface and a downwardly inclined bottom surface. The two inclined face plate surfaces protrude at an angle from an RF matrix switch and meet each other at an apex. The multi-surface face plate provides an increased interface surface area to provide space for an increased number of connection points.

The multi-surface face plate also enhances cable dressing by directing the connectors and cables toward the component to which they are connected. Cables that are routed to components mounted below the RF matrix switch are connected to connection points in the downwardly inclined bottom surface and cables that are routed to components mounted above the RF matrix switch are connected to connection points in the upper inclined top surface. Termination connectors on each cable are thereby angled toward the cable destination so that less bending stress is applied to the cable/termination connector joint by the cable's weight. Reduced bending stresses at the cable/terminating connector joint enhances conductor quality and durability.

Coaxial cables having 75 ohm BNC RF connectors are used for forward path connections. The BNC connectors allow forward path cables to be installed and replaced to interface panels having an increased density of connection points because the BNC connectors are not threaded to connection points. The MCX connectors provide an installation technician with distinct audible and tactile feedback by traversing a significant detent upon installation of a connector to a mating connection point or removal therefrom.

Return path signals in the 5 MHz to 42 MHz range do not require standard diameter coaxial cables so smaller 75 ohm MCX connectors may be used in the return path. The coaxial cable for the Return Path includes for example, RG-179, due to the fact that the RF losses of the much smaller RG-179 coaxial cable are negligible as compared to RG-6 coaxial cable in the Return Path Frequency range of signals. The 75 ohm MCX return path connectors save space because they are smaller than standard F-Type connectors and standard BNC connectors.

Features of the present invention include a connector panel for high availability cable TV network having a maximum number of connections between an RF Matrix Switch and cable head-end equipment and between a plurality of CMTS units and an RF Matrix Switch. The invention also includes minimum cable sizes in the signal return path.

The invention also features quick-connect/disconnect type terminations on both forward and return path cables. The quick-connect/disconnect type terminations are not threaded to the RF matrix switch and therefore facilitate rapid replacement of faulty cables or network components. The MCX quick-connect/disconnect type terminations also provide distinct audible and tactile feedback during installation and removal so that a technician may quickly determine when a proper connection has been effected or broken.

The invention also features increased access to cable connection points and increased view of connection points to reduce occurrences of incorrect connections. Technicians who are connecting or disconnecting cables from the cable network components can easily see which connection point they are connecting or disconnecting. The technicians can manually reach each connection point to connect or disconnect a cable while having confidence that they are accessing the correct cable.

The invention features an angled connector panel with increased surface area to facilitate a maximum number of cable connections. Another feature of the present invention includes designated surfaces of an angled connector panel having connection points facing the device to which the connector points are to be connected. Cables leave the connector panel inclined at an angle toward the destination so less bending stresses are applied to a cable and a junction between an cable end and a cable end terminal.

The invention being angled and having separate connector boards for each surface area of the angled panel, insures that the coaxial connections between the Cable TV Network and the RF Matrix Switch connector panel, provide isolation for the Multi-layer Transmission line Mid-plane board (where all of the switching is performed). In designs where extremely low loss PC board material is required to produce low loss and reliable transmission lines, ceramic materials that are commonly used in microwave are required. This low loss ceramic material could be damaged by the shock of the constant insertion or disconnecting of RF Coaxial Connectors.

BRIEF DESCRIPTION OF THE DRAWINGS

These and other features of the present invention will be better understood when reading the following description taken together with the accompanying drawings:

FIG. 7A is a plan view of a coaxial cable having an F-Type connector according to the prior art;

FIG. 7B is a pictorial end view of a coaxial cable having an F-Type connector according to the prior art;

DETAILED DESCRIPTION OF THE INVENTION

Figure 1:
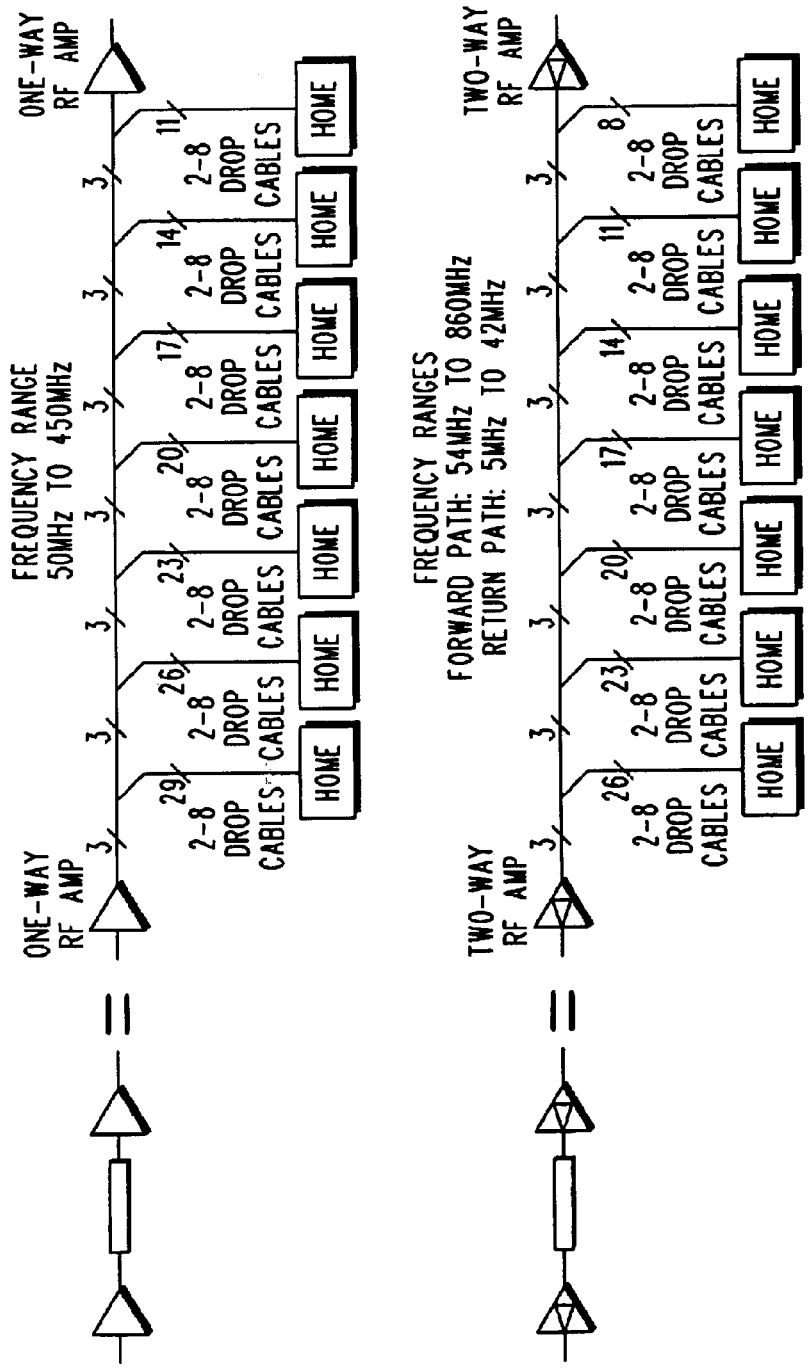
FIG. 1 is a block diagram representation of a typical coaxial cable distribution.
Figure 2:
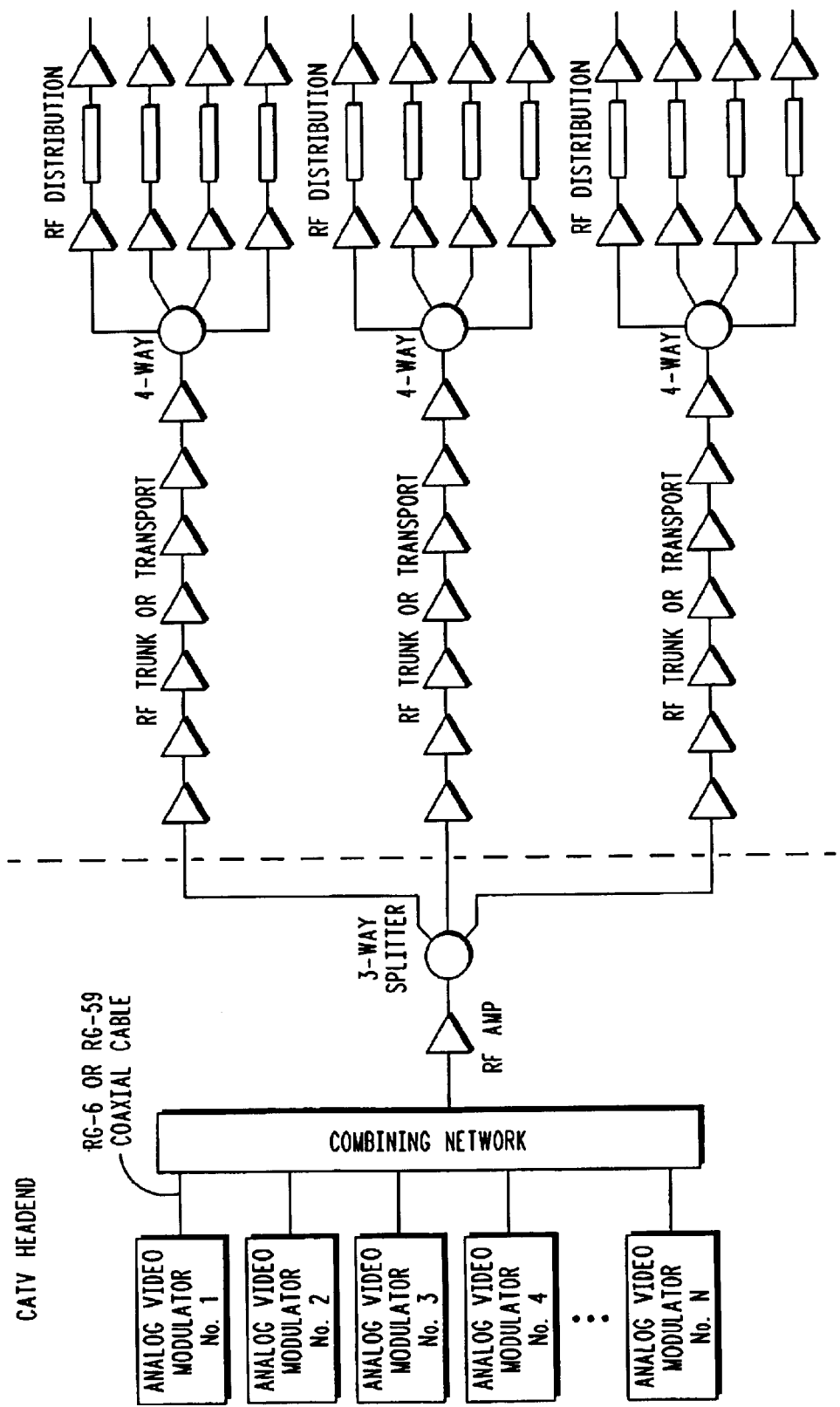
FIG. 2 is a block diagram representation of a ONE-Way Coaxial Cable TV Network.
Figure 3:
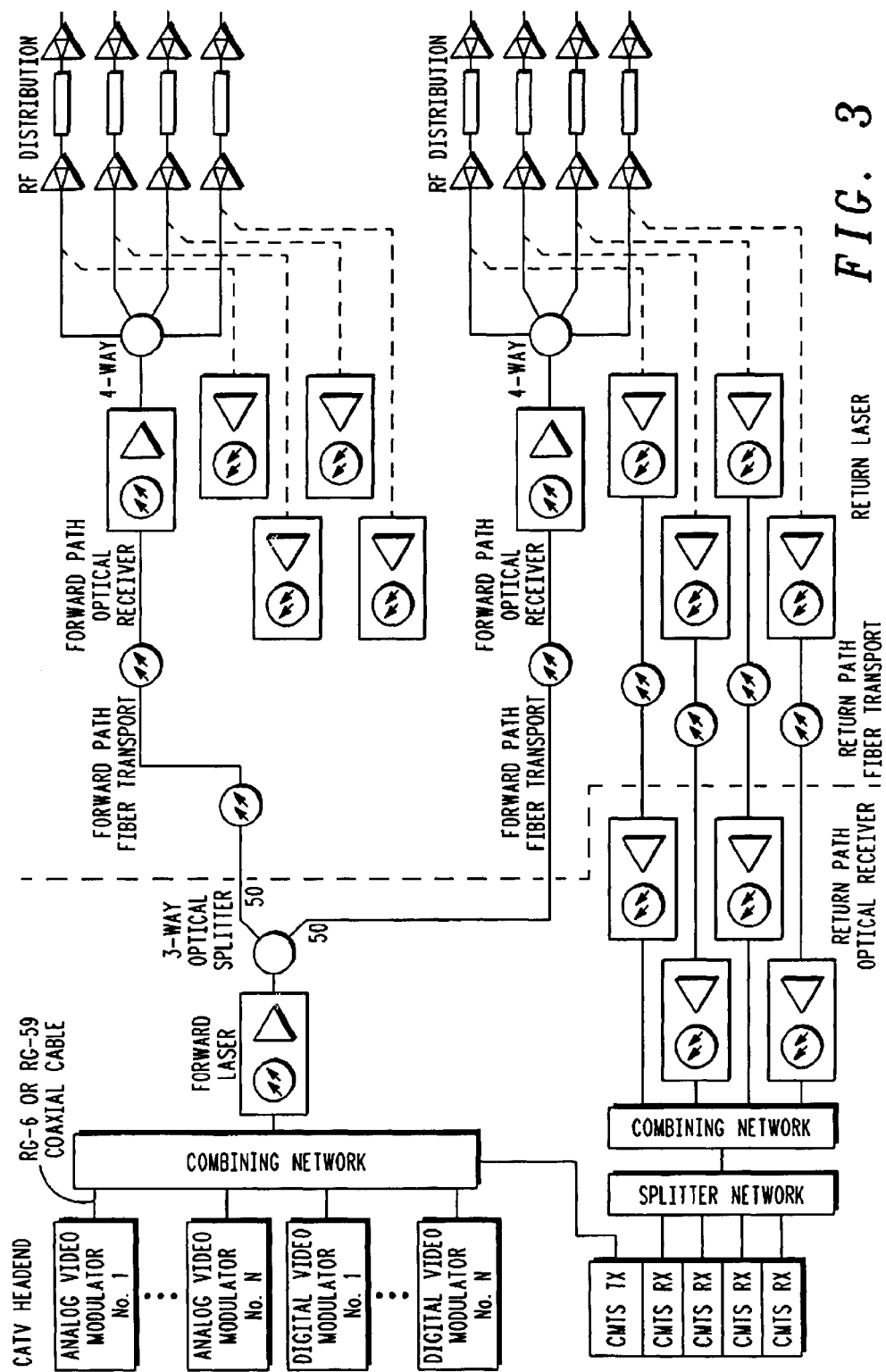
FIG. 3 is a block diagram Representation of a TWO-WAY HFC Cable TV Network.
Figure 4:
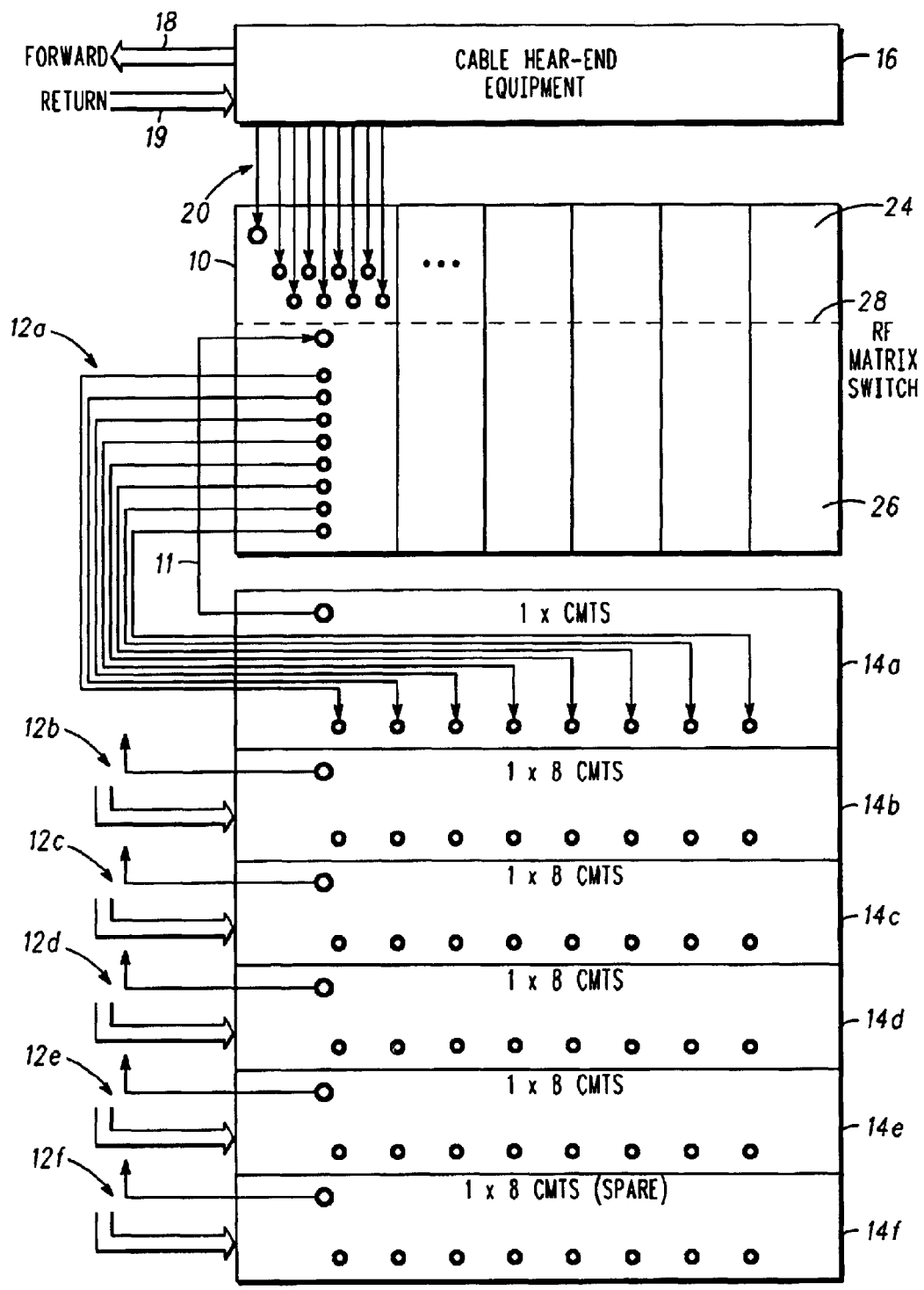
FIG. 4 is a block diagram of a cable network system according to at least one embodiment of the present invention.

A cable network component interface according to an illustrative embodiment of the present invention is shown in FIG. 4. An RF Matrix Switch 10 is connectable by a first set of cables 12 to a set of Cable Modem Termination Systems (CMTS) 14A–14F and to a cable head-end network 16. The cable head end network communicates to the RF Matrix Switch 10 through a second set of coaxial cables 20.

The set of CMTS units 14A–14F include a plurality of primary CMTS units 14A–14E and a spare CMTS unit 14F.

The illustrative embodiment of FIG. 4 includes five primary CMTS and one spare CMTS. It should be appreciated by persons skilled in the art that any number of primary CMTS units may be combined in a set with any number of CMTS units without departing from the spirit and scope of the present invention.

A forward path circuit 11 of each CMTS is connectable to a downwardly inclined panel 26 of the RF Matrix switch 10. An alternative embodiment of the present invention may include multiple forward path connections between each CMTS and the RF Matrix Switch.

The illustrative embodiment of FIG. 4 includes eight return path connections 12 between each CMTS 14 and the RF Matrix Switch 10. (To enhance clarity of the illustration, cable connections to only one of the CMTS units are illustrated in FIG. 4). Such CMTS units having one forward path circuit and eight return path circuits are commonly referred to as 1×8 slices. Alternative embodiments of the invention may include CMTS units having different combinations of forward path circuits and return path circuits. Other common configurations of CMTS units include are 1×4, 2×4 and 2×8, referring to the number of forward path circuits×the number of return path circuits in a CMTS unit or slice.

Figure 5:
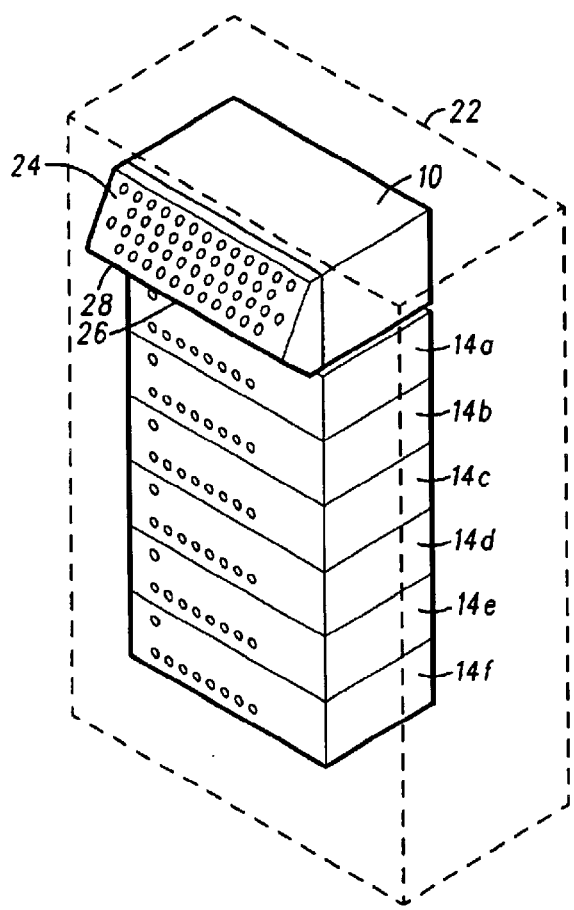
FIG. 5 is a perspective view of an RF Matrix Switch and six Cable Modem Termination Systems according to at least one embodiment of the present invention.

FIG. 5 illustrates a set of CMTS units 14A–14F in a typical physical configuration according to the one embodiment of the present invention wherein the CMTS units 14A–14F are mounted in a vertical stack in a cabinet 22 below a single RF Matrix Switch 10. The RF Matrix Switch 10 includes an upper inclined interface panel 24 and a downwardly inclined interface panel 26. The two RF Matrix Switch interface panels 24, 26 protrude angularly from the RF Matrix Switch 10 to meet each other at an apex 28. Each first set of cables 12 which connect the RF Matrix Switch 10 to each CMTS 14 are connected to mating connection points in the downwardly inclined interface panel 26. The downwardly inclined interface panel 26 provides enhanced cable dressing by directing cables toward their destination and reducing cable bending near the connection points. The second set of cables that connects the RF Matrix Switch 10 to the cable head-end equipment 16 is connected to connection points on the upper inclined surface 24 of the RF Matrix Switch 10.

While the illustrative embodiment is described in terms of CMTS units mounted below a RF Matrix Switch (which is typical in the industry), it should be appreciated that alternative embodiments may be configured having CMTS 14 units mounted above the RF Matrix Switch 10 without departing from the spirit and scope of the invention. In such embodiments an upper inclined interface panel of the RF Matrix Switch provides connection points for cables communicating with the CMTS units.

The outwardly inclined interface panels provides increased surface area and thereby allows a large number of cables having appropriate spacing to be connected to a RF Matrix Switch having a space limitation, such as for the illustrative embodiment which must fit in a 3U vertical height.

Figure 6A:
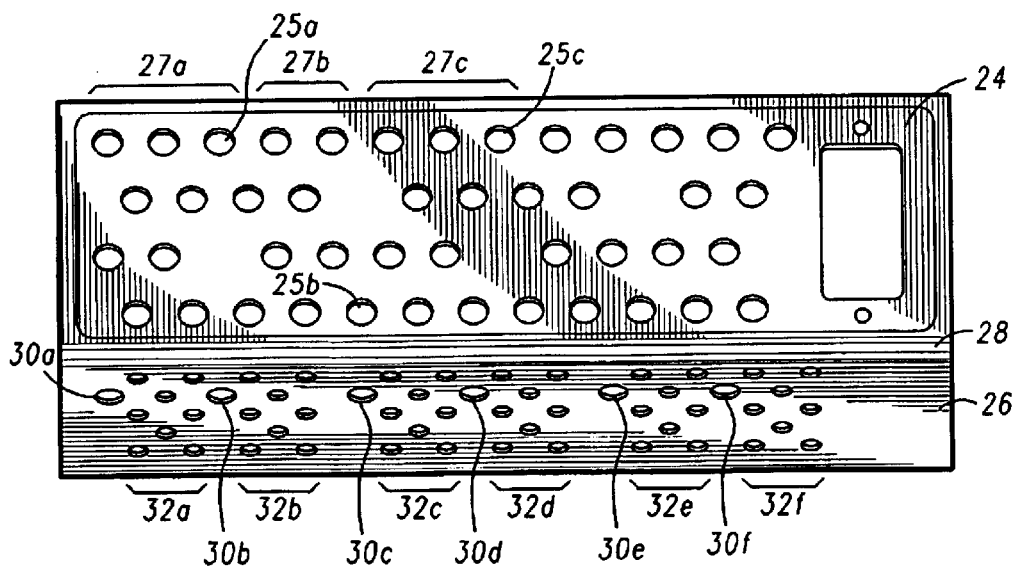
FIGS. 6A, 6B, and 6C are orthographic views of an interface panel for an RF matrix switch according to at least one embodiment of the present invention.
Figure 6B:
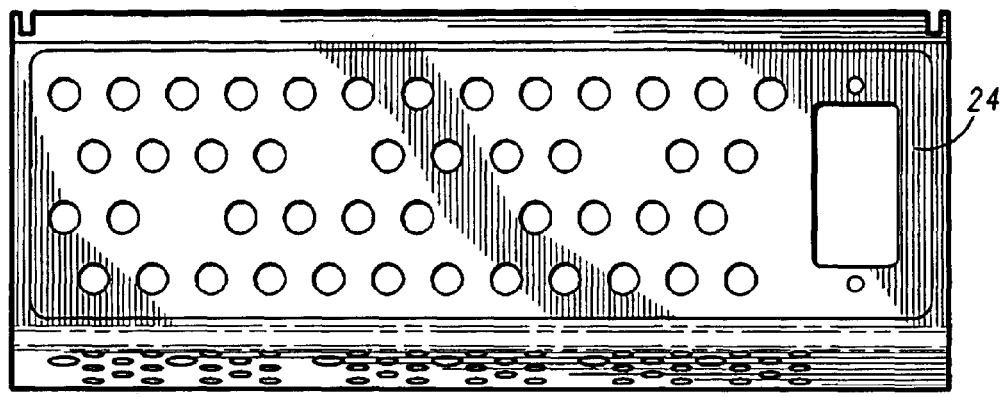
Figure 6D:
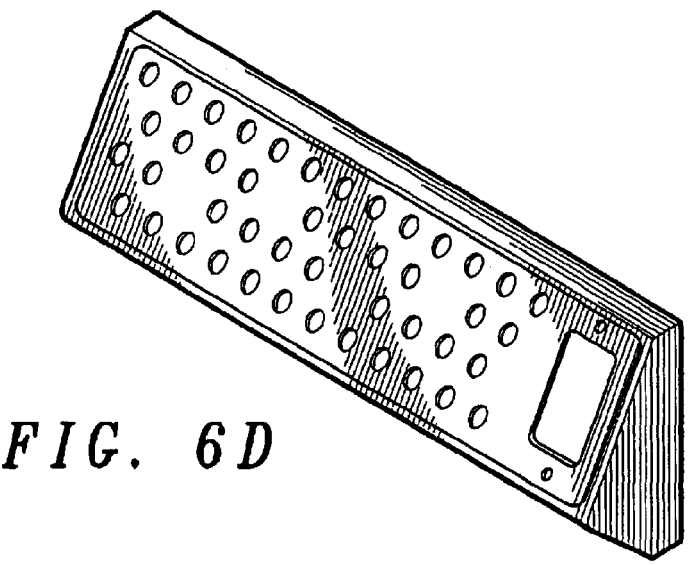
FIG. 6D is an isometric view of an interface panel for an RF Matrix Switch according to at least one embodiment of the present invention.
Figure 6C:
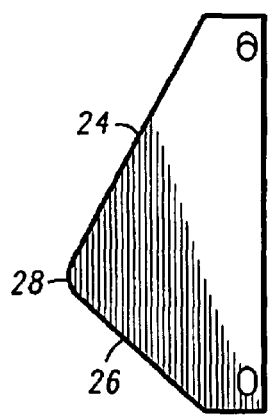
Figure 7C:
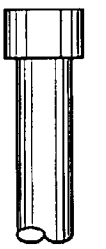
FIG. 7C is a plan view of a plan view of a coaxial cable having a 75 ohm BNC RF connector according to at least one embodiment of the present invention.
Figure 7D:
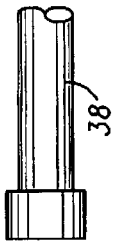
FIG. 7D is a pictorial end view of a coaxial cable having a 75 ohm BNC RF connector according to at least one embodiment of the present invention.
Figure 7F:
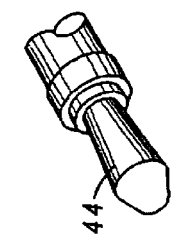
FIG. 7F is a pictorial end view of a coaxial cable having a 75 ohm MCX connector according to at least one embodiment of the present invention.
Figure 7E:
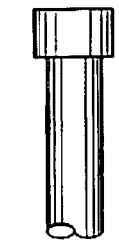
FIG. 7E is a plan view of a coaxial cable having a 75 ohm MCX connector according to at least one embodiment of the present invention.

The downwardly inclined interface plate 26 includes connection points for connecting cables from each CMTS 14A–14F to the RF Matrix Switch 10. The connection points arranged to group cables according to their respective associated CMTS 14A–14F. The RF Matrix Switch 10 according to an illustrative embodiment facilitates connection to six 1×8 CMTS units 14A–14F. Six groups of connection points are provided on the downwardly inclined interface panel 26 wherein each group includes one connection point for mating to a forward path cable and eight connection points for mating to a return path cable. Referring to FIG. 6A, an RF Matrix Switch interface panel is shown having a downwardly inclined interface panel 26 that facilitates six 1×8 CMTS units. Six forward path connection points 30A–30F are shown which are each associated with a group of eight smaller return path connection points 32A–32F. It should be appreciated that while the views of FIG. 6A-6D include several views a panel having particularly spaced cut-outs at connection point locations, connector mating hardware that is required at each connection point is not shown. By grouping the forward connector point 30 with the associated return point connectors 32, disconnecting and/or connecting a CMTS unit 14 is greatly simplified. A technician does not have to follows a rats nest of cables or look for identifying indicia on the panel 24, 26 to find the proper cables to disconnect. The cable connections are grouped in a manner which facilitates ease of use by technicians. Grouping of connection points according to their associated CMTS unit 14A–14F facilitates rapid location and identification of cable groups for rapid connection and disconnection of CMTS units 14A–14F. Grouping one forward path cable along with several smaller return path cables provides optimal spacing which is necessary to fit a large number of cables while maintaining manual and visual accessibility to the connection points.

An upper inclined interface panel 24 includes connection points for cable connections to the cable head-end equipment 16. In the embodiment described in FIG. 4 having six 1×8 CMTS units 14A–14F, five sets of cables 20 connect the RF Matrix Switch 10 to the cable head end equipment 16. The sixth CMTS 14F is a "hot" spare which will be switched in by the RF Matrix Switch 10 to the cable head-end equipment in case of a failure of one of the CMTS units 14A–14F, and so does not requires a sixth set of connection points between the RF Matrix Switch 10 and the cable head end equipment 16. In this illustrative embodiment, each set of cables 20 includes one forward path cable and eight return path cables. The panel 24 FIG. 6A includes one forward cable connector 25 and eight return path connectors grouped with the forward path connector 25, as shown by 27. This grouping provides the same benefit for easy connecting and disconnecting for head end cables 20 as provided by the connections for the CMTS 14. Another feature of the present invention as used for this embodiment is that the position of the forward path forward path connector 25 is alternated with respect to the grouping 27. As shown in FIG. 6A, a first grouping of cable connectors 27a has the forward path connector 25a in a top right position, which the next grouping of cable connectors 27b has the forward path connector 25b in a lower right position. This process is repeated, so that the third grouping of cable connectors 27c has the forward path connector 25c back in the top right position again. Further, the return path connectors are ordered based on their position to the forward path connector 25. Therefore the first grouping 27a is rotated 180 degrees (flipped) for the second grouping 27b, and then rotated back for the third grouping 27c etc. The advantages of this layout is that the return path connectors 25 are spaced far apart from each other on the panel; and the forward path connectors are always in a logical position in relation to the return path connector within their grouping 27. A technician therefore has little difficulty finding the return path cable under any condition. Further, when the technician is disconnecting or connecting a group of cables 20, the numbering and position of the forward path cables is always relative to the connection of the return path cable. For example, the first forward path cable will always connect to the connection in the same row and closest to the return path connector 25, the second forward path cable will connect to the connection in the same row as the return path connector 25 but further away, etc. The pattern of the layout allows a technician to easily and correctly locate, connect, and/or disconnect the proper cables 20 in a crowded environment.

Connection points are optimally spaced to provide optimal accessibility to a maximum number of cables in a cable network system. In the illustrative embodiment having the interface panel shown in FIGS. 6A–6D, the connection points are staggered in a pattern for maximum spacing. Also, it should be note that this application is not limited to a panel scheme only having two inclined surfaces that meet at a central apex. This scheme could easily be expanded to a multifaceted scheme where two inclined surface (one upward and one downward) that would intersect with a smaller vertical section.

Referring to FIGS. 7A–7E, forward path cables 38 that connect cable head-end equipment 16 to the RF Matrix Switch 10 and forward path cables 38 that connect the RF Matrix Switch 10 to the CMTS units 14A–14F are standard size coaxial cables having 75 ohm BNC RF connectors 40. The 75-ohm BNC RF connectors 40 are quick connect/disconnect type connectors which are necessary to replace the previously standard threaded F-Type connector 36 because space constraints do not allow sufficient access to connection points for attaching the threaded F-Type connectors 36.

Return path cables connecting the RF Matrix Switch 10 to the CMTS units 14A-14F are a RG-179 cable having a 75 ohm MCX connector or equivalent 75 ohm RF connector such as a SMB connector 44. The smaller return path cables 42 are suitable for carrying the smaller bandwidth return path signals and are essential to conserve sufficient space at the interface panel 26. The MCX connectors 44 are push-on type connectors that provide excellent electrical connection. A rapid and reliable connection or disconnection of an MCX connector 44 is readily indicated to an installer by a clear tactile and audible detent transition.

For the embodiment described above for the present invention, a total of 99 coax cables can be connected to a panel which has a 3U (5.25") vertical height limit. The two panel presentation increases the usable surface area from about 82.5 square inches to slightly over 115 square inches. Further, the layout of the connectors enhances the usefulness by optimally and logically positioning the connectors.

Figure 8:
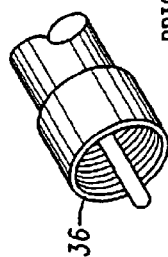
FIG. 8 is a cross sectional view of the an RF matrix switch according to the present invention.
Figure 8:
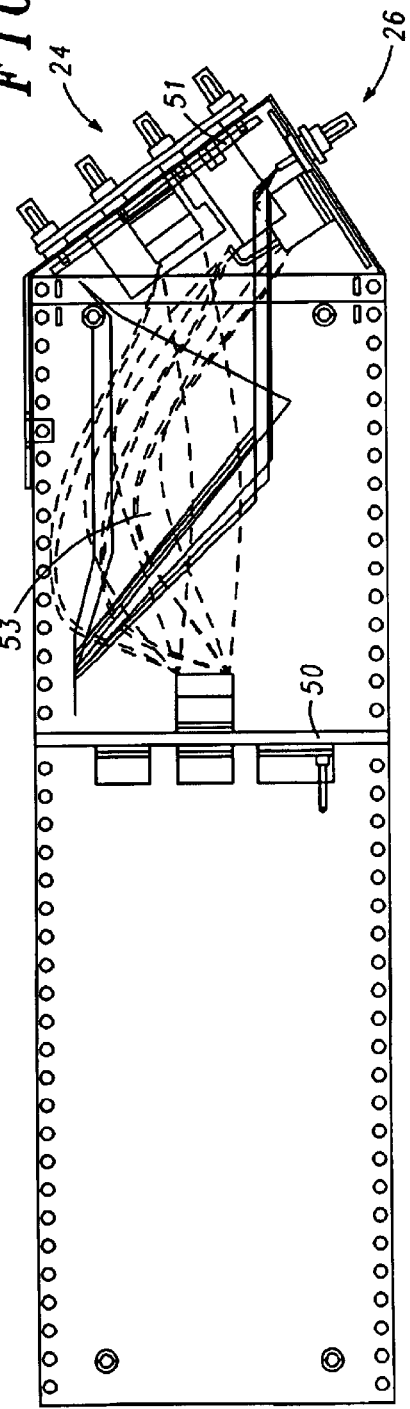

Another feature of the present invention is shown in FIG. 8, in the angular panel supports the restriction, in the case of the RF Matrix Switch, of direct cable connections to the signal backplane. This feature of the present invention allows physical separation between the critical Multi-layer transmission line mid-plane 50 and the connector boards connected to the angled panel. This feature is important in that the mid plane 50 FIG. 8 of the RF Matrix Switch terminates and transmits high speed digital and RF signals over a combination of FR-4 and Ceramic sub-straights. The ceramic sub-straight is very susceptible to fracture damage that could occur with repeated connection and disconnection of cables connectors, therefore the angular panel lends it self to establishing an interim interface point in terms of either an interface card 51, 52 and/or discrete cable connection 53 that isolates the midplane 50 from the external connections physical separation between the critical Multi-layer transmission line Mid-plane and the connector boards connected to the angled panel. The front of the panel 24, 26 may be hinged to open up and allow wiring or components to be serviced.

Although the invention is described hereinbefore with respect to illustrative embodiments thereof, it will be appreciated that the foregoing and various other changes omissions in the form and detail thereof may be made without departing from the spirit and scope of the invention.

What is claimed is:

1. A high availability RF matrix switch comprising:
    a cable network component including a first inclined cable interface panel and a second inclined cable interface panel defining a surface of said cable interface component wherein said first and second inclined interface panels meet at an apex;
    cable connection points on said first inclined interface panel suitable for mating with cables that connect said cable network component to a cable head end component, wherein said cable connection points on said first inclined interface panel are grouped based on connections to said cable head end component; and
    cable connection points on said second inclined interface panel suitable for mating with cables that connect said cable network component to a plurality of CMTS components wherein said cable connection points on said second inclined interface panel are grouped based on connections to individual CMTS components.

2. The high availability RF matrix switch of claim 1 further including:
    switching components to selectively provide electrical connections between said cable connection points on said first inclined interface panel and said cable connection points on said second inclined interface panel.

3. The high availability RF matrix switch of claim 2 wherein an extra group of cable connection points on said second inclined interface panel connect to a spare CMTS component.

4. The high availability RF matrix switch of claim 3 wherein said switching components electrically disconnects one of said plurality of CMTS components from said cable head end component, and electrically connects said spare CMTS component to said cable head end component.

5. The high availability RF matrix switch of claim 1 wherein said cable connection points on said second inclined interface panel are grouped to include at least one forward path cable connector and a plurality of return path cable connectors, to connect to one of said plurality of CMTS-components.

6. The high availability RF matrix switch of claim 5 wherein said at least one forward path cable connector supports a frequency bandwidth of 54 MHz to 860 MHz.

7. The high availability RF matrix switch of claim 5 wherein each of said plurality of return path cable connectors supports a frequency bandwidth of 5 MHz to 42 MHz.

8. The high availability RF matrix switch of claim 5 wherein each of said plurality of return path cable connectors is minimally sized and includes push-on type termination.

9. The high availability RF matrix switch of claim 5 wherein at least one of said plurality of return path cable connectors includes a push-on type 75 ohm MCX connector.

10. The high availability RF matrix switch of claim 1 wherein at least one of said plurality of return path cable connectors is connectable to cable set is RG-179 cable.

11. The high availability RF matrix switch of claim 5 wherein said at least one forward path cable connector includes a push-on type 75 ohm BNC RF connector.

12. The high availability RF matrix switch of claim 1 wherein said first inclined cable interface panel is an upper panel and is disposed above said second inclined cable interface panel, which is a lower panel.

13. A cable modem system comprising:
    a plurality of cable head end components;
    a plurality of cable modem termination system (CMTS) components, wherein said plurality of CMTS components is a greater quantity than said plurality of cable head end components; and
    an RF matrix switch component, to electrically connect each of said plurality of cable head end components to an available one of said plurality of CMTS components, said RF matrix component further including:
    a cable network component including a first inclined cable interface panel and a second inclined cable interface panel defining a surface of said cable interface component wherein said first and second inclined interface panels meet at an apex;
    cable connection points on said first inclined interface panel suitable for mating with cables that connect said cable network component to said plurality of cable head end components, wherein said cable connection points on said first inclined interface panel are grouped based on connections to each of said plurality of cable head end components; and
    cable connection points on said second inclined interface panel suitable for mating with cables that connect said cable network component to said plurality of CMTS components wherein said cable connection points on said second inclined interface panel are grouped based on connections to each of said plurality of CMTS components.

14. The cable modem system of claim 13 wherein one of said CMTS components is a spare CMTS component.

15. The cable modem system of claim 14 wherein said RF matrix switch component electrically disconnects one of said plurality of CMTS components from one of said plurality of cable head end components, and electrically connects said spare CMTS component to said one of said plurality of cable head end components.

16. The cable modem system of claim 13 wherein said first inclined cable interface panel is an upper panel and is disposed above said second inclined cable interface panel, which is a lower panel.

* * * * *